C. B. STEELE.
GAS GENERATOR.
APPLICATION FILED APR. 16, 1908.
1,227,974.
Patented May 29, 1917.
3 SHEETS—SHEET 2.
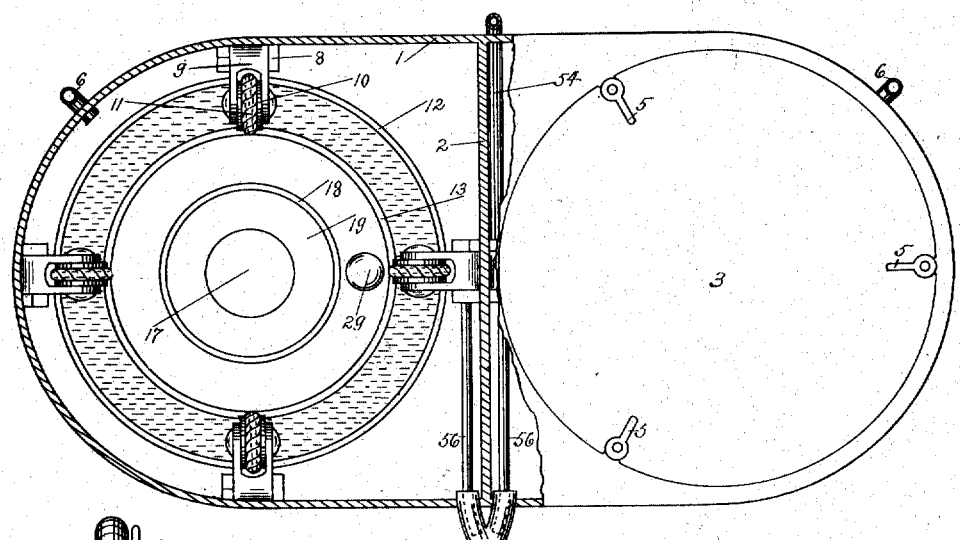
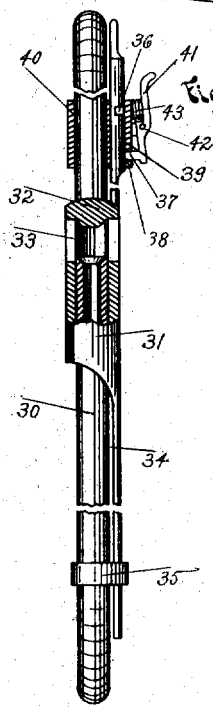
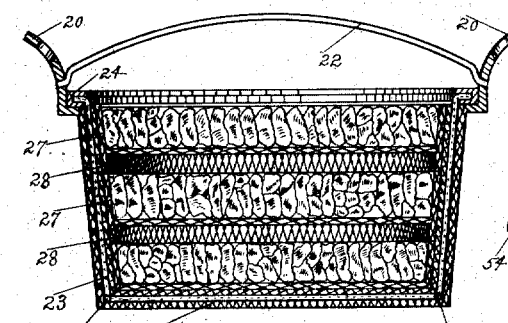
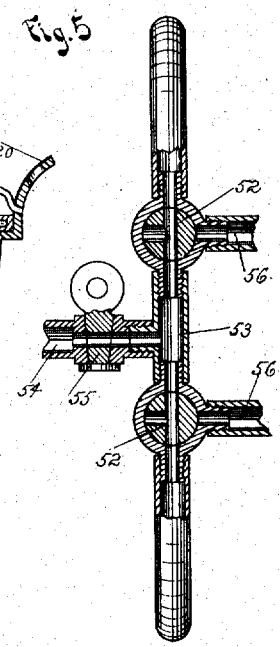
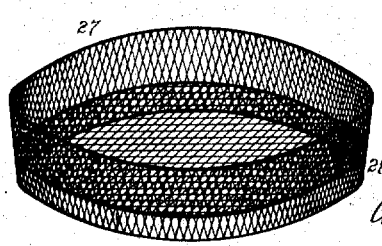
Witnesses
Eliza B. Wheeler
James M. Luke
Inventor
Charles Brewster Steele

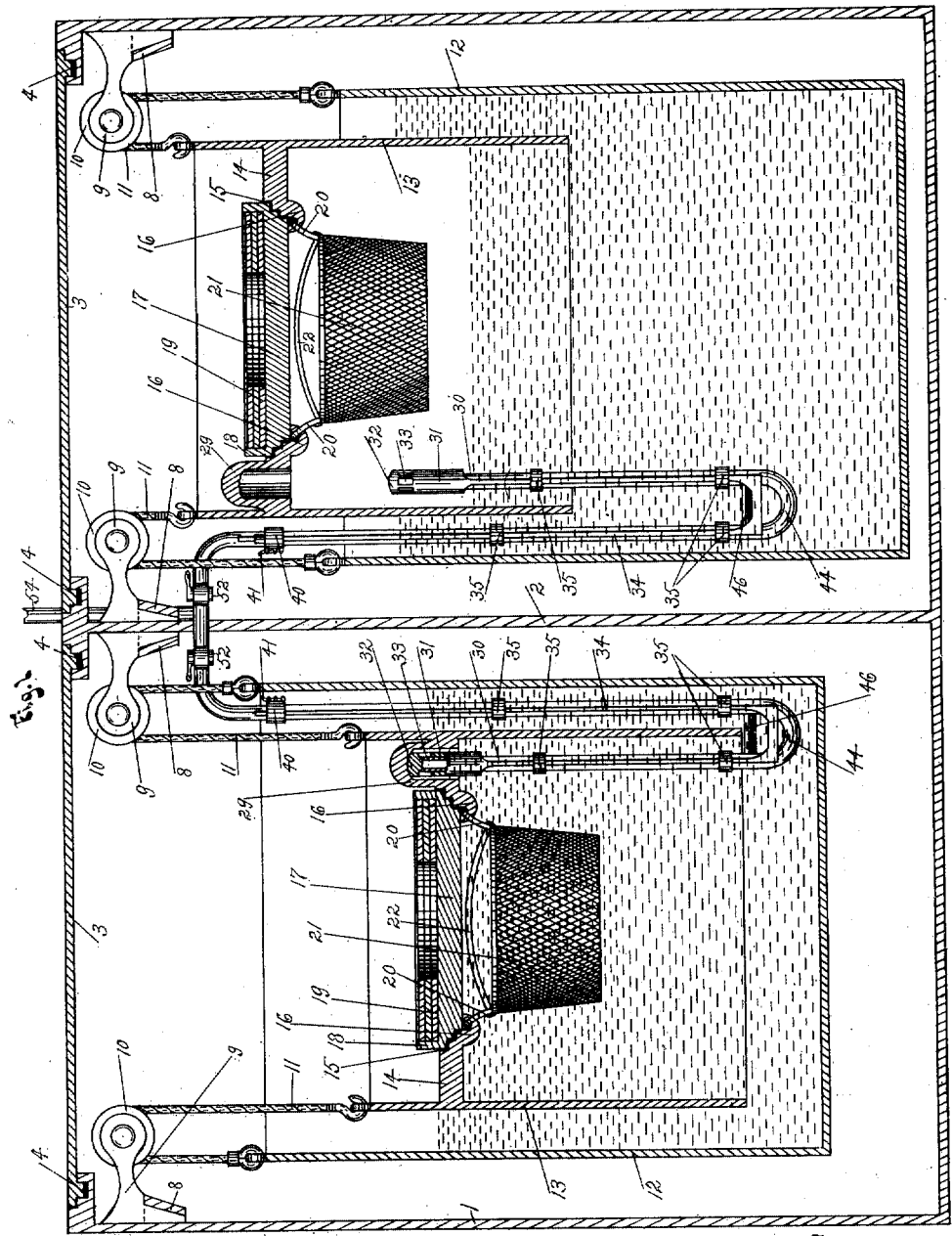

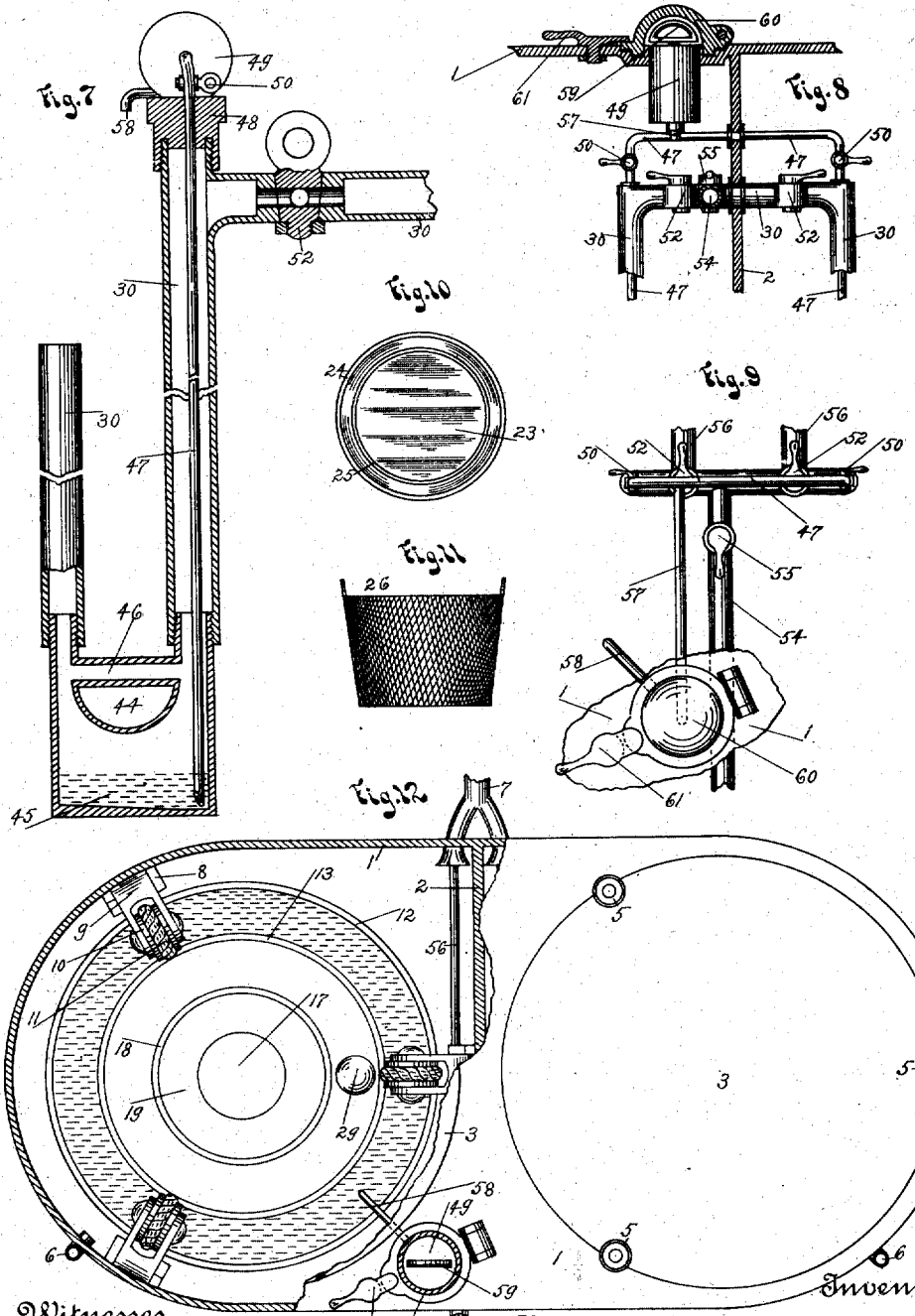

UNITED STATES PATENT OFFICE.

CHARLES BREWSTER STEELE, OF NEW YORK, N. Y.

GAS-GENERATOR.

1,227,974.　　　Specification of Letters Patent.　　Patented May 29, 1917.

Application filed April 16, 1908. Serial No. 427,511.

*To all whom it may concern:*

Be it known that I, CHARLES BREWSTER STEELE, a citizen of the United States, and a resident of New York, in the county of New York and State of New York, have invented a certain new and useful Gas-Generator, of which the following is a specification.

My invention is a gas-generating plant, more especially designed for the production of a hydro-carbon gas by the union of a carbid with water, but broadly stated my invention is as well adapted for the generation of a gas from any decomposable salt by contact with an acid, when the parts are constructed of such material as to resist the action thereof, the device being equally applicable for use in a chemical laboratory, for the generation, for instance, of hydrogen from scraps of zinc, or carbon dioxid from cubes of marble, or oxygen from a peroxid.

This plant consists of a plurality of individual coöperative generators, composed of mutually counterbalanced inverted gas receptacles and water receptacles, each individual generator being provided with gas outlet conduits that unite in the gas supply main, the outlets of each individual generator being automatically "cut off" when the carbid in the individual generator has ceased to produce gas, and the generator becomes "dead", all residue gas being carried off previous to recharging, and any air within an individual generator conducted away subsequent to recharging, with absolute safety, by the gas-air "blow off" pipes, said automatic "cut offs" preventing any gas from entering the building in which the plant may be located when the interior of any individual generator is exposed during the operation of being recharged, all the individual generators being capable of simultaneous, or individual use, for supplying gas to the main, all the generating units and working parts being surrounded and inclosed in a sealed compartment casing, with ventilation pipes coactively and conjunctively operating with the "blow off" pipes. The disposition of the generators within this sealed case, provided with the air ingress and egress pipes, permits of a continuous circulation of fresh air around the generators, even when they are inactive, and produces an increased and forced circulation when the generators are operating, induced by the alternate approach and recession of the gasometers or inverted gas receptacles, and water receptacles, thereby, surrounding all the generating ports with cooling and differential intervening temperatures, that condense any moisture that may be absorbed by the gas, and precipitate such moisture to the trap formed in the outlet conduits, together with the means for removing the precipitated moisture, which results in the delivery for use, of a cool, dry gas, possessing the highest degree of luminosity and candle power.

The advantage obtained by the counterbalancing of the gasometer and the water receptacle, so that the gasometer, by the application of weights, will slightly overcome the weight of the water receptacle when it is filled with water to the working level, is, that the gas will always be under, substantially, the same pressure, because the acceleration is slow, since the mass to be moved, which is the sum of the weight of the gasometer, the water, and the receptacle, is very large, in comparison to the weight acting to move them, and since the water receptacle rises an equal distance to meet the gasometer, which carries the carbid, the distance that the carbid must move to reach the water, is only one half that required in any other type of generator; consequently, the velocity of the carbid in descending is very much less, so that it would not enter the water as deeply, but, on the contrary, comes only slightly in contact with the water, the gas pressure then immediately forcing the water and the carbid apart, depressing the water, and causing the gasometer and the carbid therein, to rise away from the water, by the combined action of the two, maintaining the distances between the surfaces of the water seal and that inside the gasometer nearly constant, thereby preventing that sudden and rapid decomposition of the carbid, and excessive generation of gas, so common to generators heretofore known.

An additional means for preventing excessive generation is provided by constructing the carbid holder so that the carbid is disposed in a series of layers, spaced apart, so that the liquid cannot come into contact with the entire mass of carbid at once, but, will act, successively, on the several layers, from the bottom to the top, whereby, substantially, dry carbid is always present in the holder, until the water reaches the uppermost layer, thus preventing premature decomposition and after generation, the water receptacle being always kept clean and free from disintegrated carbid by the debris retainer of the carbid holder.

While the generators, individually and collectively, will operate with absolute safety, without the protective casing, yet, this casing is supplied as an extra precaution, so that if the generators, by any means, were entirely demolished, no danger from them could menace the building in which the plant was installed, all of which is hereinafter more fully described in the specification, illustrated in the drawings, and designated in the claims, in which like numerals represent like parts, in the different figures respectively.

Figure 1 is a vertical section of the generating plant when two generating units are employed.

Fig. 2, is a plan of the same, with a portion of the top of the casing broken away.

Fig. 3, is an end elevation of the gasometer gas outlet pipe, partly in section.

Fig. 4, is a vertical section of the carbid receptacle.

Fig. 5, is a plan view, partly in section, of the gas outlet pipe, showing the connecting gas main and "blow off" pipes, and their controlling valves.

Fig. 6, is a perspective view of a carbid tray.

Fig. 7, is a vertical section of the gas outlet pipe of one of the individual generators, showing the trap for the water of condensation and means for removing the same.

Fig. 8, is an elevation, partly in section, of the top of the gas outlet pipes of two live generators, showing the connections to the pump for drawing out the water of condensation, and a fragment of the inclosing casing and its sealed closure, that permits access to the pump handle, and connecting pipes and valves.

Fig. 9, is a plan view of the same, with a fragment of the inclosing casing, showing the general pipe arrangement and connection, and the pump closure.

Fig. 10, is a plan view of the debris retainer, showing its top and bottom shape preserving rings.

Fig. 11, is an elevation of the debris retainer skeleton protector.

Fig. 12, is a plan of a generating plant, with part of the top of the casing broken away, showing the pump, with its closure in section.

The numeral 1 represents the inclosing casing, divided into separate sealed compartments by the partition, 2, and provided with closures, 3, suitably sealed by gaskets, 4, and secured by clamps, 5, and provided with air inlet and outlet pipes, 6, and 7, respectively, each of which leads to the outside of the building. To the inside, and near the top of the casing walls and partition, are secured sockets, 8, for the reception of the brackets, 9, in which are journaled pulleys, 10, over which pass the cables, 11, to one end of which are suspended water receptacles, 12, and to the other end gasometers, 13, which consist of cylinders open at their lower ends and closed at a short distance below their upper ends by the transverse walls, 14, provided with charging openings, 15, from the edge of which depend hooks, 16, the ends of said hooks being in contact with the closures, 17, when said closures are suitably sealed and secured in position. Extending upwardly from each closure is the annular projecting rim, 18, surrounding the annular counterbalancing weight, 19.

Suspended from the hooks, 16, by the loops, 20, is the reticulated carbid receptacle, 21, provided with the hand bail, 22, the contacting of the hooks, 16, with the closure, 17, firmly securing and locking the carbid receptacle in operative position, and precluding the possibility of its being dislodged. Within and closely fitting the walls and the bottom of the carbid receptacle is the debris retainer, 23, made of any suitable strong woven fabric or flexible absorbent material through which water may percolate, but that will retain the disintegrated carbid, preventing it from dropping into and fouling the water receptacle, and also, permitting said debris to be removed with the carbid receptacle when the generator is recharged. To the top of this debris retainer is secured the ring, 24, and within and at its bottom is secured the ring, 25, both serving to keep it in proper shape. Closely fitting within said debris retainer is the reticulated basket, 26, to prevent any injury to the fabric when the carbid trays, 27, are inserted, or removed from the carbid receptacle, said trays, 27, consisting of reticulated materials formed with conical sides, with their bottoms united to, and intermediate the tips and bottoms of the sides, the portion, 28, of the sides, below the bottom, forming a space between each tray, to permit the water to attack the carbid.

The transverse wall, 14, of the gasometer is provided with an upwardly projecting hollow dome, 29, to receive the valved end of the gas outlet pipe, 30, when the carbid has been exhausted, and the gasometer has dropped to its lowest position, thereby forcing the valve, 31, to its seat, upon the end of the gas outlet pipe, 30, automatically "cutting off" the gas between the two generators, to prevent any flow of gas from the "live" generator to the "dead" generator, during the operation of recharging. The valve, 31, is formed of a cylinder, closed at one end, from which projects into the cylinder the valve closure, 32, the upper end of the cylinder being provided with slots, 33, to permit the gas to enter the end of the pipe, 30, when the valve is open. Extending downward from the cylinder is the valve rod, 34, bent in the form of a U and held in position by guides, 35, secured to the U shaped pipe, 30. The upper end of this rod is provided with a bolt socket, 36, for the reception of the locking bolt, 37, which enters the perforation, 38, in the sleeve, 39, which is rigidly secured to the pipe, 30, through which sleeve extends the rod, 34. To the sleeve or bracket, 40, is flexibly attached a lever, 41, fulcrumed on the sleeve at 42. Between the sleeve and the upper end of the lever is secured a compression spring, 43, which forces the detent bolt, 37, into the bolt socket, 36, when the gasometer reaches its lowest position and forces the valve to its seat whereby the valve is automatically securely locked.

The pipe, 30, is provided with a trap, 44, for the water of condensation, from the gas, which is always present when the gas is generated in contact with the water at any temperature above normal, and which is precipitated when the gas is cooled by radiation. Whenever a gas conduit descends to a lower level before it rises, the water of condensation will collect at the lower level of the pipe, causing the lights to alternately, flare, and, become dim. Said trap, 44, is provided with a well 45, in which the water of condensation will collect without affecting the flow of gas through the pipe, since the by-pass, 46, will permit the gas to pass from one leg of the U to the other. This by-pass is spaced from the top of the well of the trap in order that there may be a circulation of the liquid of the water receptacle, between the gas by-pass and the top of the well, in order to condense the vapors in the well, so they will drip into the well, and prevent their being carried over with the gas, the shape of the trap being such that the condensation will run down, and drip from the center of the top of the well. The bottom of the well inclines to the point from which leads the suction pipe, 47, which extends from the bottom of the well up through the branch of the pipe, 30, through the perforated sealed cap, 48, screw threaded to the top of said pipe, 30, and is connected to the pump, 49, which is used to withdraw the water of condensation from the trap, when the valve, 50, is opened, discharging it to the water receptacle, through the discharge spigot, 58, one pump serving to empty a plurality of traps by suitable pipe connections, this construction possessing the great advantage of freeing the traps of water while the generating plant is in active operation and generating gas, while the plant remains hermetically sealed.

At the upper end of each of the pipes, 30, just beyond the point where they turn at right angles toward each other, are the duplicate three way valves, 52, united by a common T coupling, 53, to which is secured the gas main 54, provided with a "cut off" valve, 55. From each three way valve lead the air "blow off" pipes, 56, that connect with the air outlet ventilating pipes, 7, that unite in a common conduit, the "blow off" pipes being of smaller diameter, extending within the ventilation pipes a short distance, thereby giving an injector action to any air within the casing, when the three way valves are turned to open communication with pipes, 30, and the "blow off" pipes.

In Figs. 8, 9, and, 12, is shown connections for drawing off water from the traps by means of one pump, the pipes, 47, leading from each trap, uniting in the common conduit, 57, which connects directly with the single cylinder solid reciprocating piston type pump, 49, provided with the discharge spigot, 58, said pump, 49, extending upward through, and forming an air-tight joint, flush with, the top of the casing, 1, the pump handle, 59, being covered by the hinged closure, 60, which is securely sealed and held in closed position by the clamp, 61.

The manner of charging and operating this device is as follows:—

Assuming that the generating plant has been in proper operation, and that one generator has become exhausted, or "dead", as disclosed in Fig. 1, the three way valve of the "dead" generator outlet pipe is turned to exhaust through the air "blow off" ventilating pipe, and the weights removed from the gasometer, which causes the gasometer to rise to the top of the casing. The gasometer closure is then removed and the carbid receptacle taken out, and an extra, duplicate, refilled carbid receptacle is suspended in position in the gasometer and the closure replaced. The valve, 31, is then unlocked and opened, and the weights replaced upon the closure, whereupon, the gasometer will immediately descend and commence to generate gas, forcing the air out the "blow off" pipe, which is allowed to continue until the air has blown off and the gas runs pure, which time has been determined for each size of generator by factory test, after which time the three way valve is turned to connect the gas outlet pipe with the house main, and the casing closed.

The extra carbid receptacle, which has just been removed from the generator, is then cleaned by removing the trays, the cage, and the debris retainer, dumping out the disintegrated carbid refuse, washing the parts, and drying the receptacle, and placing the parts again in position in reverse order of removal, after the trays have been filled, when the carbid receptacle is ready for use when needed for recharging the generator.

This generator is not only perfectly safe while in active operation, but absolutely safe while being recharged, in reality, "fool proof", for when an individual generator becomes "dead", all the gas has been forced out of the gasometer into the service pipe, and automatically locked therein; consequently, there is no gas left in the generator to escape, when the closure of the gasometer is removed, and the generator can be recharged with absolute safety while the lights of the building remain burning, since the burners are constantly supplied with gas from the companion generator, and as long as there is provision for "blowing off" the air from the recharged generator, none can enter the service pipes when the recharged generator is again connected with the house main; therefore, no air will be admitted to the pipes leading to the burners, and, consequently, the lights will not be extinguished. There can never be an overproduction of gas, nor any "blowing out" of the water seal, because the carbid receptacle cannot fall into the water receptacle, for when the gasometer closure is in position, the carbid receptacle is locked in place; nor can any of the carbid fall through the walls of the carbid receptacle, being prevented by the debris retainer; consequently, there can be no pre-generation, over-generation, after-generation, or any fouling of the water receptacle.

In Figs. 8, 9, and 12 the suction pump, 49, for withdrawing the water of condensation, is shown extending within the casing, with suitable pipe connection indicated for a plurality of generators, covered and sealed by a suitably hinged, gasketed, and fastened closure, 60, so that access may be had to the pump at all times, while any, or all, of the generators are in active operation, without the necessity of removing the covers of the casing, and maintain the double sealing integrity and safety of the generating plant.

The qualities desirable, essential, and requisite to constitute a perfect generating plant for gas, are that it shall be, easy to charge and keep clean, quick to generate the gas when suddenly drawn upon, able to maintain an even gas pressure, freedom from obstruction of its outlet, simple in structure, cool when generating gas, certain of ventilation, capable of being recharged while it is supplying gas to lighted burners, with provision for preventing air entering the gas main, and never permitting the escape of gas to the generator room of the building, all of which contribute to render the plant absolutely safe and inspire confidence in its action, the generating plant disclosed in this application fully possessing all of these essentials.

Having described my invention, what I claim as new in this application for Letters Patent, is:—

1. A gas generator consisting of a liquid receptacle and a gasometer each being movable relatively to the other provided with a gas outlet pipe, a valve provided with an automatic lock governing the outlet pipe adapted to be locked in closed position when the gas has all been withdrawn.

2. In a gas generator, a liquid receptacle, a plurality of flexible connections, one end of each connection being attached to the liquid receptacle, a bell inverted within the receptacle to which is attached the other end of each of the flexible connections, pulleys suitably supported over which the flexible connections run to support the receptacle and bell, a carbid holder within the bell, and a gas outlet pipe extending within the bell.

3. In a generator, a fluid receptacle, a bell disposed in said receptacle, each relatively movable to the other, flexible connections between said bell and said receptacle, whereby the said bell and receptacle may approach and recede from one another under variations of gas pressure, said bell being provided with a removable cover, and a carbid basket detachably connected to said cover.

4. In a generator, a liquid receptacle, a gas receptacle movably disposed therein, a carbid holder within the gas receptacle, pulleys suitably supported, flexible connections attached at their ends to the receptacles and running over the pulleys, each receptacle being attached to opposite ends of the flexible connections.

5. In a generator, a liquid receptacle, a carbid holding receptacle movably disposed therein, flexible connections between said receptacles and supports for said connections, the carbid holding receptacle being so weighted that when charged with carbid it is of greater weight than the liquid receptacle when charged with the proper amount of water, each receptacle being attached to opposite ends of the flexible connections.

6. In a gas generator a liquid receptacle, an inverted gas receptacle disposed therein provided with a holder for gas generating material, both receptacles being flexibly supported and adapted to approach and recede from each other.

7. A gas generator comprising a movable liquid receptacle and a movable gas receptacle provided with a holder for gas generating material said gas receptacle being in direct communication with the liquid receptacle and adapted to form a seal with the liquid in the liquid receptacle both of said receptacles having flexible supports normally tending to move both of said receptacles closer together but permitting both of said receptacles to be moved farther apart on the increase in volume of gas therein.

8. A gas generator, comprising a liquid receptacle normally overcounterbalanced by a mass subject to the attraction of gravity and a gas receptacle undercounterbalanced by a mass subject to the attraction of gravity both in direct communication with each other, the gas receptacle being above the liquid receptacle and means for generating gas therein thereby causing the gas receptacle to ascend and the liquid receptacle to descend.

9. A gas generator consisting of a movable liquid receptacle and a movable gas receptacle provided with means to hold a gas generating material, a gas outlet conduit, the movable liquid receptacle and the movable gas receptacle receding from each other upon increase of gas pressure and approaching each other under decrease of gas pressure.

10. A gas generator consisting of a gas receptacle provided with means to hold a gas generating material and a liquid receptacle compensatingly movable in relation to each other whereby both receptacles recede from one another under increase of gas pressure and approach each other upon decrease of gas pressure.

11. A gas generator consisting of a plurality of generators connected in series each generator having a movable liquid receptacle and a movable gas receptacle provided with means to hold a gas generating material that recede from one another under increase of gas pressure and approach each other upon diminution of gas pressure, an air tight casing surrounding the plurality of generators, means to alternatively automatically disconnect one of the plurality of generators from the remainder, and means to overcome air pressure within the air tight casing.

12. A gas generator consisting of a movable liquid receptacle and a movable gas receptacle provided with means to hold a gas generating material counterbalancing one another, gas outlet conduit, the movable liquid receptacle and the movable gas receptacle receding from each other upon increase of gas pressure and approaching each other upon decrease of gas pressure.

Signed at Washington, in the District of Columbia, this 15th day of April, A. D. 1908.

CHARLES BREWSTER STEELE.

Witnesses:
WM. SHEDD HOLTON,
ROGER E. NELSON.

Copies of this patent may be obtained for five cents each, by addressing the "Commissioner of Patents, Washington, D. C."